United States Patent [19]

Hanser et al.

[11] Patent Number: 4,746,133
[45] Date of Patent: May 24, 1988

[54] AUTOMATIC LEVELING SYSTEM

[75] Inventors: Paul E. Hanser, Wilton; Carl H. Meier, Davenport; Leroy A. Vanroekel, Wilton, all of Iowa

[73] Assignee: HWH Corporation, Moscow, Iowa

[21] Appl. No.: 16,245

[22] Filed: Feb. 19, 1987

[51] Int. Cl.⁴ ............................................. B60S 9/00
[52] U.S. Cl. ..................................... 280/6 R; 180/41; 254/423; 280/DIG. 1
[58] Field of Search ............... 280/6 R, DIG. 1, 6.1, 280/6 H; 180/41; 254/423, 86 R

[56] References Cited

U.S. PATENT DOCUMENTS 4,061,309 12/1977 Hanser ................................ 254/423
4,084,830 4/1978 Daniel, Jr. et al .................. 280/6.1
4,390,187 6/1983 Maeda ................................ 280/6 R Primary Examiner—Kenneth R. Rice
Attorney, Agent, or Firm—Charles H. Schwartz; Ellsworth R. Roston

[57] ABSTRACT

In combination for use in a vehicle having a front, a back and sides to level the vehicle relative to gravity. A plurality of devices each disposed at an individual position relative to the vehicle and in displaced relationship to the other devices for adjusting the vertical position of the vehicle relative to gravity in accordance with the operation of pairs of adjacent devices. A sensor disposed relative to the vehicle for sensing the tilting of the vehicle from a level disposition relative to gravity. An operating structure responsive to the sensor for operating pairs of adjacent devices in a particular order to obtain an adjustment in the vertical position of the vehicle from side to side and front to back to obtain a resultant leveling of the vehicle relative to gravity.

47 Claims, 5 Drawing Sheets

AUTOMATIC LEVELING SYSTEM

BACKGROUND OF THE INVENTION

1. Field of the Invention

The present invention relates to a system for leveling vehicles, such as recreational vehicles relative to gravity and more particularly to systems for automatically leveling such vehicles. The invention is particularly adapted to be used in vehicles which employ hydraulic jacks to level the vehicles relative to gravity, but the invention may also be used with an air leveling system forming a part of the suspension of the vehicle.

2. Description of the Prior Art

Recreational vehicles are now in wide-spread use to provide families and individuals with vacation opportunities at relatively low costs. The recreational vehicles allows families and individuals to visit out of the way locations and to enjoy these locations at relatively low cost. The vehicles also provide such families and individuals with the opportunities to hunt, fish, hike and engage in a number of outdoor sports while being assured of adequate accommodations at these outdoor locations.

Quite often the recreational vehicles have to be parked at sites which are not level relative to gravity. This results from the fact that the campsite may be located in rugged terrain. However, to obtain the benefits from such camp sites, the recreational vehicle should preferably be level relative to gravity. For example, when the vehicle is level relative to gravity, dishes on dinning tables are stable and sleeping accommodations are superior since they are level and thereby more comfortable.

Since recreational vehicles are often parked at non-level sites, jacks have been provided to adjust the disposition of the vehicle so as the make the vehicle level relative to gravity. These jacks may be either hydraulically or electrically operated. The jacks are generally disposed at the corners of the recreational vehicle and are attached to the vehicle at the underside of the vehicle. The jacks may be individually operated to adjust the level of the vehicle relative to gravity. As it will be appreciated, the individual operation of the jacks is time consuming and additionally, it is difficult to be precise in the leveling procedure. It can be seen that such a difficult and time consuming procedure can be disturbing when an individual or family arrives tired and hungry at a campsite in the evening and then has to level the vehicle relative to gravity before the evening meal can be prepared and served and before the individual or family can then relax for the evening.

Since the recreational vehicle industry is relatively large, a considerable effort has been made and substantial sums of money has been extended to overcome the problems discussed in the previous paragraph. Some progress has been made. For example, the jacks in use have been improved through the years so that their performance is more reliable than the performance of the jacks manufactured and sold a number of years ago. In spite of such progress, however, problems still remain. Specifically, with jacks that have to be individually operated, there is no assurance that leveling of the vehicle relative to gravity can be accomplished in a reasonable period of time.

There have also been prior art systems for automatically leveling a vehicle relative to gravity. One prior art system, such as shown in my prior U.S. Pat. No. 4,597,584, includes a plurality of extendable jacks, preferably hydraulic, located at strategic positions at the bottom of the vehicle. A lurality of switches sense the downward tilting of the vehicle relative to gravity at the individual strategic positions and produce individual signals to individually operate the jacks in accordance with such tilting. The jacks are individually extended in a particular sequence depending upon the particular direction in which the vehicle is tilted relative to gravity.

In my prior art system, the jacks become extended when the hydraulic pressure in hydraulic circuit exceeds a particular value. The jacks tilted the greatest relative to gravity are initially extended. Since the rear of the vehicle weighs considerably more than the front, the switches are constructed and/or connected in a circuit to resolve any ambiguities in favor of initially operating the jack at the rear of the vehicle. A delay is preferably provided between the operation of each jack and the operation of the next jack in the sequence so that transients in the movement of the vehicle from the operation of each jack can be eliminated before the next jack is operated.

In addition, in my prior art system, when the vehicle has been leveled relative to gravity, any jacks still not engaging the ground are extended until they engage the ground with reduced force. In addition, in my prior art system, when the hydraulic forces in the jacks are less than a particular value and the vehicle is traveling between destinations, the hydraulic fluid in the jacks is slowly bled to a reservoir so that hydraulic forces cannot accumulate in the jacks to operate the jacks.

Although my prior system operated satisfactorily to automatically level the vehicle, there are still situations where there could be problems with the prior system. For example, in the prior automatic leveling system, one jack at a time was extended to level the vehicle. This could in some situations produce considerable stress and deflection in the vehicle. Also, there could be situations where a vehicle can be supported primarily from opposite corners, which again could provide considerable stress and deflection in the vehicle. It would, therefore, be preferable that as much as possible, the vehicle at all times should be supported at four places to thereby minimize any stress and deflection in the vehicle.

SUMMARY OF THE INVENTION

In the present invention, the level sensing unit is designed and mounted so as to indicate if the right or left side is low, or if the front or back is low. This is essentially a forty-five degree shift in position for the sensing devices as compared to my prior art system. Since the system now operates from either side to side, or front to back, the jacks may be operated in pairs as oppose to individually. Therefore, either the two right jacks or the two left jacks are generally operated so as the level the vehicle side to side. Also, either the two front or the two rear jacks are operated to level the vehicle front to back. In some modifications of the invention, individual jacks may be operated at particular times to accommodate special situations, but when possible, pairs of jacks are operated.

By extending two jacks at a time, the vehicle is rolled to the right or to the left, or the front or the rear of the vehicle is lifted. The vehicle, therefore, at all times remains supported at four places with the possible exception when one jack reaches full stroke and another jack continues to lift. In general, the system in the present invention does not give any preference to any corner or side of the vehicle, but there are priorities that may be controlled by a microprocessor. For example, the microprocessor may give priority to a low corner signal over to a low side signal and a low side signal over a low front or rear signal. Therefore, the microprocessor may first control the extension of an individual jack as required to correct a corner and then two side jacks as required to level the vehicle side to side and then the microprocessor controls the front or rear jacks again as required. If a low side is again indicated by a sensor during a front to back levelling, the processor will then stop the front or rear jacks and extend the side jacks to again level the vehicle side to side. This will continue until the vehicle is level as indicated by the various level sensors, or until the hydraulic pressure increases to a level to trip an electical pressure switch.

Once the vehicle has been leveled by the use of the pairs of the jacks as described above, then the microprocessor can automatically proceed to a stabilizing mode. In a stabilizing mode, all jacks not already in contact with the ground with a preset minimum load will be extended. This is to insure that each jack will support a reasonable proportion of the weight of the vehicle and not produce any excessive stress at any one corner of the vehicle.

The automatic leveling system of the present invention can also be operated in a manual mode if desired, but again the jacks will generally be operated in pairs to control either the side to side, or front to back leveling of the vehicle. In addition, after the jacks are initially positioned for extension, then it may be desirable to place blocking material under the jacks so that no one jack can receive an excessive load.

In addition to the use of the present invention with a hydraulic or electrical leveling system, it is also possible to use the system of the present invention with an air leveling sytem. In such an air leveling system, the vehicle includes integral suspension air bags. Each air bag is an integral part of the vehicle suspension and is positioned by each one of the four wheels. Using these integral air bags, the present invention utilizes the same leveling concept in that it inflates or deflates two air bags at a time when possible. By operating the two front, two rear, two right, or two left air bags, the vehicle is gently tilted right or left, forward or backward. In this way, the vehicle is usually equally supported at all four corners which as described above minimizes twisting, stress and deflection. Some air leveling systems control both front air bags together and the front air bags cannot be operated separately. This would not effect the front to back leveling since both front or both rear air bags can be operated in pairs. However, the side to side leveling is effected since it is not possible to operate a single front air bag with a single rear air bag. In this type of air leveling system, the rear air bags are operated individually to provide the side to side leveling and the front to back leveling is provided by the pairs of front or rear air bags.

BRIEF DESCRIPTION OF THE DRAWINGS

A clearer understanding of the present invention will be had with reference to the following description and drawings wherein.

DESCRIPTION OF THE PREFERRED EMBODIMENTS

Figure 1:
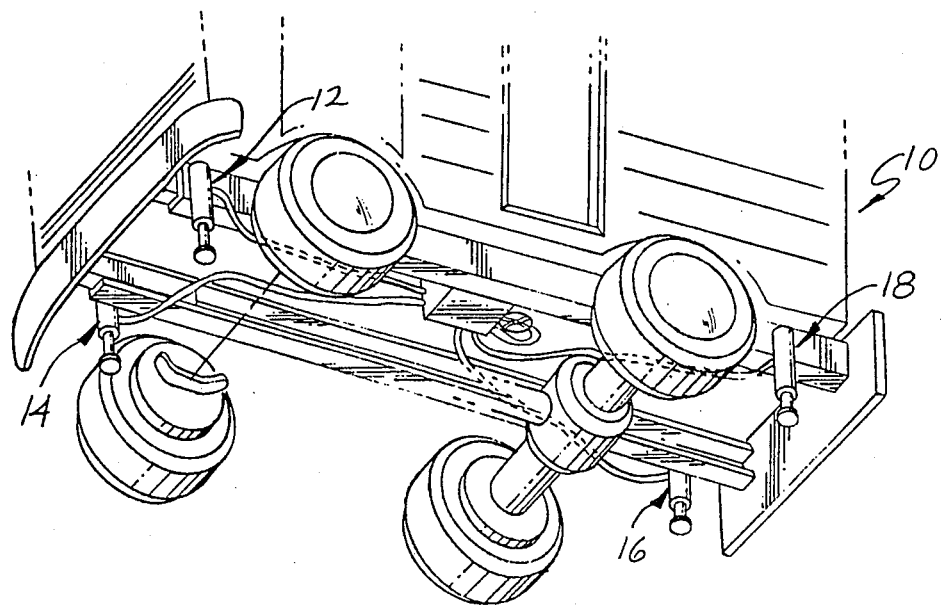
FIG. 1 is a schematic perspective view of the under side of a recreational vehicle and of jacks disposed at strategic positions at the under side of the vehicle to level the vehicle.

In a first embodiment of the invention, a system is provided for automatically leveling, relative to gravity, a vehicle as shown in FIG. 1, which is generally indicated by reference numeral 10. The vehicle 10 may be a recreational vehicle, but it may also be any other type of vehicle, such as a trailer. Therefore, as used in the present specification and claims, the term vehicle means any type of carrier for transporting persons or objects.

The leveling of the vehicle 10 relative to gravity is provided by extending pairs of a plurality of jacks, such as jacks 12, 14, 16 and 18. The jacks are preferably attached to the under side of the vehicle 10 at positions near the corners of the vehicle. The jacks 12, 14, 16 and 18 may be constructed in a conventional manner, such as disclosed and claimed in my prior U.S. Pat. No. 3,817,493 issued Jan. 18, 1984, for a "Hydraulic Jack for Trailers", my U.S. Pat. No. 4,165,861 issued Aug. 28, 1979, for a "Vehicle Leveling System", or my U.S. Pat. No. 4,061,309 issued Dec. 6, 1977, for a "Vehicle Leveling System Device Therefore". Each of the jacks 12, 14, 16 and 18 initially receives hydraulic fluid to become pivoted to a vertical position from a horizontal position. The jacks are originally disposed against the underside of the vehicle 10 in substantially flush relationship with the underside of the vehicle. After the jacks are pivoted to the vertical position, then as controlled in the present invention, pairs of the jacks are then extended downwardly upon a further introduction of hydraulic fluid to the jacks. However, it would be appreciated that the present invention will also operate with jacks which are constructed to become extended or retracted only in the vertical direction without first becoming pivoted from the horizontal position to the vertical position.

Figure 2:
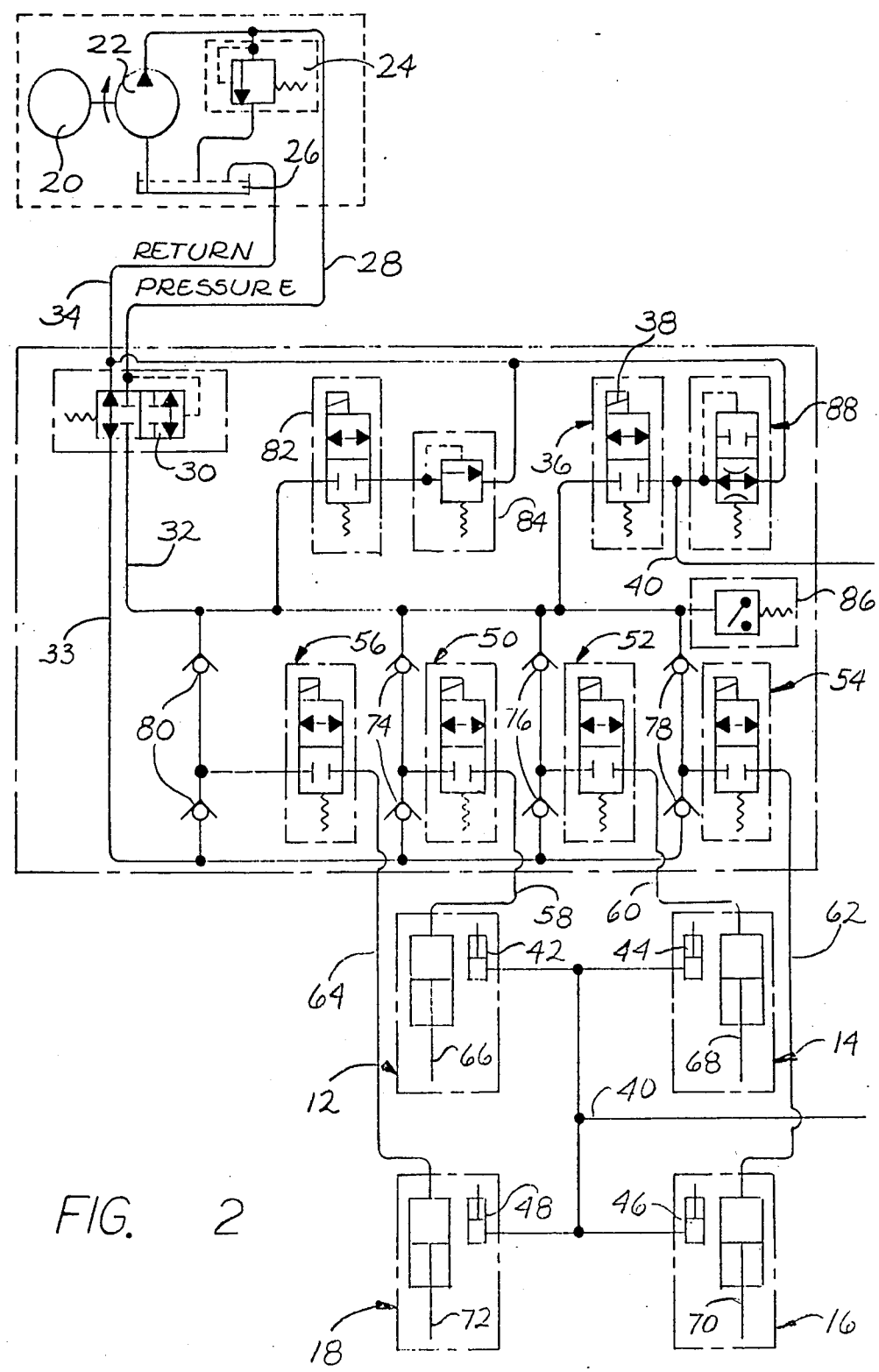
FIG. 2 schematically shows a hydraulic system for automatically leveling a recreational vehicle.

A hydraulic circuit for the first embodiment of the invention is shown in FIG. 2. The hydraulic circuit includes a motor 20 which drives a pump 22. A hydraulic line extends from the pump 22 to a relief valve 24. The relief valve is set to operate at a particular pressure, such as approximately three thousand pounds per square inch (3,000 psi). The relief valve may be constructed in a conventional manner. The relief valve 24 operates to introduce hydraulic fluid to a reservoir 26 so as to provide a direct bypass from the pump 22 to the reservoir 26 when excessive pressure occurs in the line, such as if there is a malfunction.

A hydraulic line 28 extends from the pump 22 to a hydraulic pressure switch 30. Specific details of the hydraulic pressure switch 30 may be had with reference to my prior U.S. Pat. No. 4,597,584 issued July 1, 1986. In general, the pressure switch operates to pass the hydraulic fluid from the pump 22 to a hydraulic line 32 when the fluid introduced to the valve 30 has at least a particular pressure, such as approximately six hundred pounds per square inch (600 psi). When the hydraulic pressure introduced to the pressure switch 30 is less than six hundred pounds per square inch (600 psi), the hydraulic fluid from the line 33 passes to the reservoir 26 through a return line 34. This switch insures that there is sufficient pressure on the line 32 to properly operate the remaining portions of the hydraulic system when pressure is desired and provides for the release of fluid from the valve to the reservoir when desired.

The hydraulic fluid in the line 32 is introduced to a horizontal/vertical valve 36. Specific details of this valve may be seen with reference to my prior U.S. Pat. No. 4,597,584. The valve 36 is operated electrically, such as by a solenoid 38. The valve 36 operates to pivot the jacks 12, 14, 16 and 18 from the horizontal position to the vertical position whenever a master switch is closed to obtain the operation of the automatic leveling system and when the automatic leveling cycle is started. The output from the valve 36 is applied through hydraulic line 40 to individual members 42, 44, 46 and 48 in the jacks 12, 14, 16 and 18 for pivoting the extendable arms of the jacks from their horizontal positions to their vertical positions.

Valves 50, 52, 54 and 56 are respectively connected to the jacks 12, 14, 16 and 18 through hydraulic lines 58, 60, 62 and 64. The valves 50, 52, 54 and 56 are activated in pairs in accordance with the signals provided by the switches shown in FIGS. 4 and 5. These signals provide controls to the system dependent upon the tilting of the recreational vehicle from a horizontal level. When individual or pairs of the valves 50, 52, 54 and 56 are activated, hydraulic fluid passes to the associated individual or pairs of the jacks 12, 14, 16 and 18 to activate individual or pairs of jacks to produce an extension of individual or pairs of arms 66, 68, 70 and 72 in the jacks.

Individual sets of check valves 74, 76, 78 and 80 are coupled to the jack actuator valves 50, 52, 54 and 56. A stabilizer valve 82 is also coupled to the hydraulic line 32. The stabilizer valve 82 may be constructed in a manner similar to that of the valve 36. The valve 82 is also operated to obtain an extension of the jacks 12, 14, 16 and 18, but through the check valves 74, 76, 78 and 80. Specifically the valve 82 is operated after the vehicle has been leveled. At that time, fluid flows through the stabilizer valve 82 to control the pressure on the line 32 to be a relatively low pressure, such as approximately two hundred pounds per square inch (200 psi). At that time, fluid flows through the check valves 74, 76, 78 and 80 and through solenoid valves 50, 52, 54 and 56 to extend to the ground any jacks 12, 14, 16 and 18, which are still displaced from the ground. The jacks can extend, but only to engage the ground with the relatively low force controlled by the stabilizer valve 82. If any jack had been previously extended during the level operation, it would typically be engaging the ground with a higher force and therefore, would not be operated when the stabilizer valve 82 is energized.

A relief valve 84 is connected between the reservoir 26 and the stabilizer valve 82. The valve 84 constitutes a relief valve to pass the fluid from the valve 82 to the reservoir 26 when the pressure of the fluid through the valve and thereby the line 32 exceeds the particular limit, such as approximately two hundred pounds per square inch (200 psi). In this way as described above, jacks 12, 14, 16 and 18 are extended to the ground after the leveling of the vehicle 10 relative to gravity with such a low force that the leveling is not disturbed. The relief valve 84 may be constructed in a conventional manner.

Figure 3:
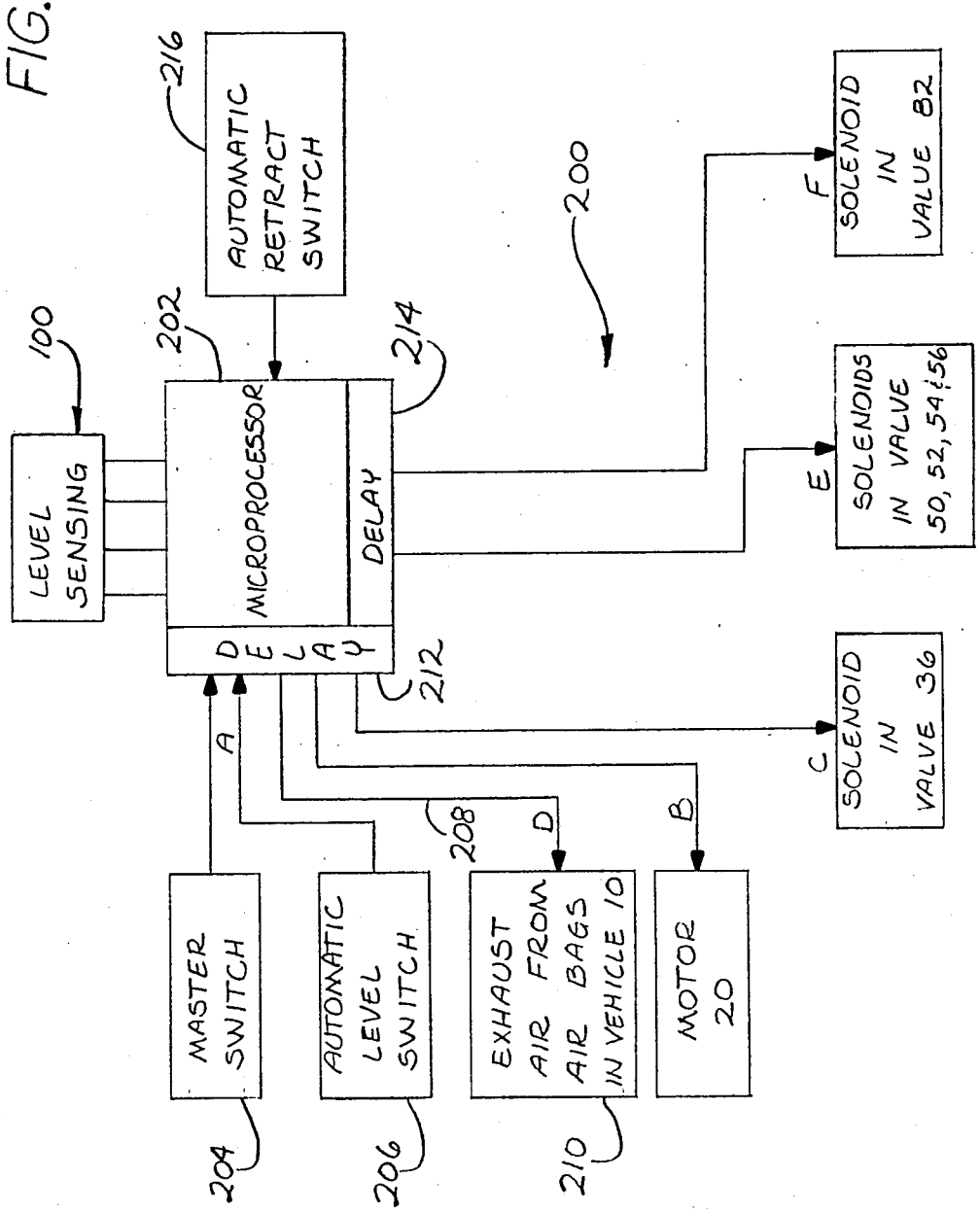
FIG. 3 is a schematic block diagram of a microprocessor system for controlling the operation of a hydraulic system shown in FIG. 2.

A pressure switch 86 may also be included in the hydraulic system of FIG. 2. The switch 86 may respond to a particular pressure, such as approximately twenty-five hundred pounds per square inch (2,500 psi). When the switch 86 responds to such a pressure, it produces an output signal, such as a signal to a microprocessor shown in FIG. 3 representing that this pressure limit has been reached. The microprocessor may then discontinue the extension of any of the pairs or individual one of the jacks providing this hydraulic pressure. The system may then continue to obtain the extension of a different pair of jacks after a delay sufficient in time for all transients in the movement of the vehicle 10 to disappear. A pressure as high as twenty-five hundred pounds per square inch (2,500 psi) may, for example, be produced in the jack when the jack has been fully extended or when excessive pressure is imposed on the jack for some other reason.

A bleeder valve 88 is also included in the hydraulic circuit of FIG. 2 and is connected between the hydraulic line 40 and the reservoir 26. The construction of an appropriate bleeder valve may be seen with reference to my previous U.S. Pat. No. 4,597,584. In general the valve 88 is operative at a particular pressure less than approximately six hundred pounds per square inch (600 psi) to bleed hydraulic fluid from the line 40 to the reservoir 26. This is desirable because heat from the vehicle 10, while traveling or from the sun, may cause the pressure of the hydraulic fluid in the jack actuators 42, 44, 46 and 48 to increase to a level sufficient to cause the jacks 12, 14, 16 and 18 to be individually pivoted from the horizontal position to the vertical position, even when the vehicle 10 is traveling between destinations. As will be appreciated, such an occurance is undesirable because at the very least, the jacks can be damaged when the vehicle travels over a bump. By slowly bleeding the fluid through the relief valve 88 the pressure of the fluid of the jack actuators can never be built up to a value where the jacks can be inadvertently pivoted from the horizontal position to the vertical position.

When the hydraulic system shown in FIG. 2 is to be operated, the motor 20 drives the pump 22 to produce a flow of the hydraulic fluid. The pump 22 then introduces hydraulic fluid to the pressure switch 30, which is normally closed to prevent fluid from flowing through the switch. When the pressure of the hydraulic fluid reaches a preset value, such as six hundred pounds per square inch (600 psi), the switch 30 is operated to provide for delivery of fluid to the members 42, 44, 46 and 48 in the hydraulic jacks 12, 14, 16 and 18. The jacks are then operated to pivot the extendible arms and the jacks are moved from the horizontal position to the vertical position.

After the extendible arms of the jacks 12, 14, 16 and 18 have been pivoted to the vertical positions, individual or pairs of the jacks are then extended downwardly in a particular order. Specifically, individual jacks are extended to correct a low corner, then either two right jacks or two left jacks are extended to level the vehicle side to side. Then either two front or two rear jacks are extended to level the vehicle front to back. The sequence continues until the vehicle is level. The sequential operation of the pairs of jacks occurs through the hydraulic circuit including the pump 22, the pressure switch 30 and the valves 50, 52, 54 and 56. The vehicle is generally leveled in a relatively short period, such as a period less than one minute. A delay may be provided between extension of a first individual of pair of jacks in the sequence relative to the extension of the next pair of jacks in the sequence. This delay is provided to make sure the transients in each correction of the vehicle relative to gravity in either the side to side or front to back directions, by the operation of any particular individual or pair of the jacks 12, 14, 16 and 18, will not effect corrections in a subsequent side to side or front to back correction.

As indicated above, any jack in the pair of jacks may experience pressures as high as twenty-five hundred pounds per square inch (2,500 psi) as it is being extended. This may result from the extension of the jack to its full length. When this pressure is produced, the switch 86 produces a signal to the microprocessor. The microprocessor then instructs the next pair of jacks in the sequence to become extended after a suitable delay to eliminate any transients in the movement of the vehicle 10.

As indicated above, one or more of the jacks 12, 14, 16 and 18 may not be engaging the ground, even after the vehicle has been leveled. The stabilizer valve 82 is operated to extend downwardly the arms of any of those jacks which still do not engage the ground. This occurs by a flow of fluid through the appropriate ones of the sets of check valves 74, 76, 78 and 80 and with the pressure in the check valves controlled by the stabilizer valve 82 in combination with the relief valve 84. Any jacks which are not engaging the ground will, therefore, be operated to engage the ground with a pressure such as two hundred pounds per square inch (200 psi) so as to stabilize the vehicle 10. Any jacks which have already engaged the ground would normally be under pressure greater than two hundred pounds per square inch (200 psi) and would thereby not be further extended when the stabilizer valve 82 is actuated.

After the recreational vehicle has been leveled relative to gravity and stabilized, the vehicle 10 is maintained in this position until the occupants of the vehicle are ready to travel to another site or to another destination. At this time, the extendable arms of the jacks 12, 14, 16 and 18 are retracted and are then pivoted to the horizontal position. The jacks are pivoted to the horizontal position by energizing valve 36 through fluid returns via line 40, valve 36, check valves 74, 76, 78 and 80, line 33, valve 30 and line 34. The valve 88 is thereby effective to bleed from the jacks 12, 14, 16 and 18 any fluid producing a pressure in the jacks of less than six hundred pounds per square inch (600 psi). By bleeding any pressure hydraulic fluid from the actuating portions of the jacks, this prevents pressures of the fluids in the jacks from accummulating and the jacks cannot be inadvertently pivoted from the horizontal position to the vertical position while the vehicle is traveling between destinations. This prevent the jacks from becoming inadvertently damaged.

The hydraulic circuit also include specific fail safe features: For example, the pump 22 includes a relief valve 24 so that when the fluid from the pump exceeds three thousand pounds per square inch (3,000 psi) the fluid is relieved through the relief valve 24 to the reservoir 26. In addition, the valve 86 prevents the pressure fluid in the circuit from exceeding twenty-five hundred pounds per square inch (2,500 psi) while the pairs of jacks are being extended to level the vehicle relative to gravity when operating in the automatic mode.

Figure 4:
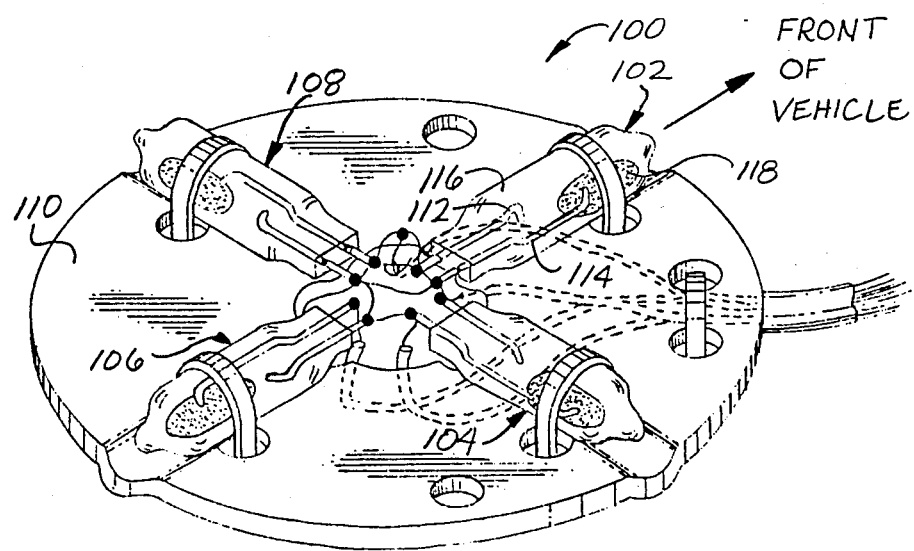
FIG. 4 is a schematic perspective view of a switching assembly for controlling the operation of the hydraulic system of FIG. 2 and the microprocessor system of FIG. 3.
Figure 5:
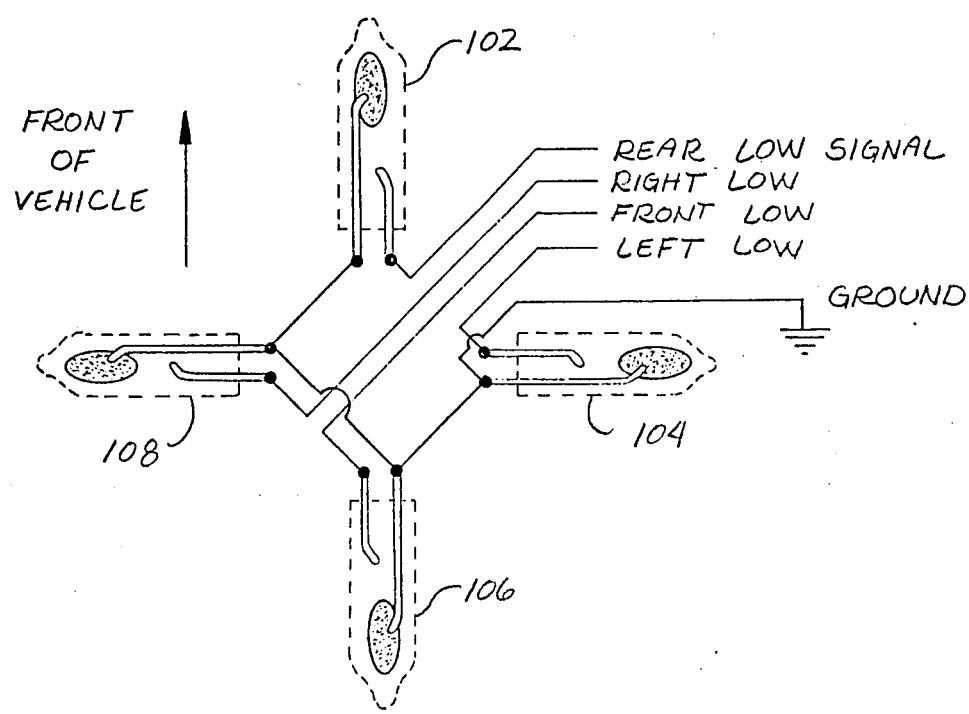
FIG. 5 is a circuit diagram showing electrical connection between particular ones of the switches shown in FIG. 4.

The present invention also includes the use of a switching assembly 100 as shown in FIGS. 4 and 5. The switching assembly includes a plurality of switches, such as the switches 102, 104, 106 and 108, all disposed on a support member 110 which in turn is mounted on the vehicle 10. Each of the switches 102, 104, 106 and 108 may be constructed in a similar manner. For example, the switch 102 is provided with a pair of spaced contacts 112 and 114 disposed within an elongated envelope 116.

A blob 118 of suitably conductive material, such as mercury, is also disposed in the envelope 116. The blob 118 of conductive material is movable into engagement with the contacts 112 and 114 in accordance with the tilting of the recreational vehicle 10 from a horizontal level. When the blob 118 of conductive material engages the contacts 112 and 114, it produces electrical continuity between the contacts. The blob 118 of conductive material moves away from the contacts 112 and 114 when the recreational vehicle is tilted in an opposite direction.

The switches 102, 104, 106 and 108 are disposed on the support member 110 and mounted on the vehicle to point towards the front and back and the two sides of the recreational vehicle. For example, the switches 102, 104, 106 and 108 respectively point towards the front, the right side, the rear and the left side of the recreational vehicle. Thus, the switch 102 becomes closed when the back of the vehicle is tilted downward The switch 104 becomes closed when the left side of the vehicle is tilted downward. The switch 106 becomes closed when the front of the vehicle is tilted downward and the switch 108 becomes closed when the right side of the vehicle is tilted downward. It can also be seen that two of the switches can be closed at the same time so as to indicate that one corner of the vehicle is tilted downward. For example, if switches 102 and 104 both become closed, this indicates that the back left corner of the vehicle is tilted downward. When any such corner signal occurs, individual jacks may be extended to level the corner of the vehicle as an initial step before using pairs of jacks for leveling.

When the switch 102 becomes closed, the rear jacks 16 and 18 are extended to raise the rear of the vehicle from the ground. When the switch 106 becomes closed, the front jacks 12 and 14 are extended to raise the front of the vehicle from the ground. Similarly when the switch 104 is closed, the left side jacks 12 and 18 are extended to raise the left side of the vehicle. Finally, when the switch 108 is closed, the right side jacks 14 and 16 are extended to raise the right side of the vehicle.

Normally the system give priority to a low corner signal represented by signals from two switches at the same time. After this is corrected by leveling using individual jacks, then the system gives priority to a low side over a low front or rear signal. Typically, signals from either of the switches 104 and 108 take precedence over signals from the switches 102 and 106. FIG. 5 illustrates the electrical connection of the switches and the designation of the specific meaning of the individual signals from the particular switches are described. If for example, both the switches 102 and 104 are closed, this means that the back of the vehicle is tilted downward and to the left. Jack 18 is then extended until either the signal from switch 102 or 104 is removed. If, for example, there is still a signal from switch 104, which means that the left side is low, this take precedence over any later signal from the switch 102 meaning that the rear is low. The periodic use of an individual jack, when there is an indication of a low corner, eliminates over-shoot during the use of the pairs of jacks.

FIG. 3 schematically shows an electrical system generally indicated at 200 and including a microprocessor 202 for operating in the proper sequence the various portions of the automatic leveling system described above. The system shown in FIG. 3 also includes a master switch 204 and an automatic level switch 206 for controlling the operation of the system.

When the master switch 204 is closed, the microprocessor is energized to preset the system for automatic operation. The automatic level switch 206 may now be closed for a first time as indicated by (A) in FIG. 3 to energize the motor 20. This energizing of the motor 20 is indicated by the letter (B) in FIG. 3. The motor 20 then operates the pump 22 to obtain a flow of fluid through the hydraulic circuit shown in FIG. 2. The solenoid in the valve 36 is then energized in accordance with a sequence provided by the microprocessor 202 to obtain a flow of fluid to the actuators 42, 44, 46 and 48 in the jacks so as to pivot the extendible arms of the jacks from the horizontal positions to the vertical positions. This is indicated by a letter (C) in FIG. 3. As previously disclosed, this step may be eliminated if the jacks are only vertically extendible without first being pivoted from the horizontal position to the vertical position.

The system recognizes that the jacks have been swung into the vertical position since when that occurs hydraulic pressure will increase in the system until the electrical pressure switch 86 closes. This signals the microprocessor 202 to de-energize the horizontal/vertical solenoid valve. Once the jacks have been swung to the proper vertical position, then the operator of the vehicle may visually confirm the operation of the jacks and place blocking under the jacks if desired. It is to be appreciated that if one or more of the jacks is at a cosiderable different distance above the ground than other ones of the jacks that it would be desirable to place blocking under the appropriate ones of the jacks so as to equalize as much as possible, the travel of the jacks.

The automatic level switch 206 may now be actuated a second time to complete the automatic operation. If the vehicle includes airbags, such as the vehicle shown in FIG. 6, then the microprocessor 202 man operate to obtain an exhaustion of air in the air bags. This is indicated by a line 208 extending from the microprocessor 202 to a box 210 which is designated exhaust air from airbags in vehicle 10. The letter (D) also designates that this is the next step in the sequence.

After a preset delay time, as shown in general by the delay 212, the processor proceeds with leveling. Specifically, as signaled by the level sensing unit 100, the microprocessor 202 will energize pairs of solenoids and occasionally individual solenoids in the valves 50, 52, 54 and 56 as shown by the letter (E) in FIG. 3. Either two right, two left, two front or two rear solenoids are normally energized at a time, thus extending two jacks at a time. The microprocessor 202 give priority to a low corner and then to a low side over a low front or rear signal, therefore, the microprocessor controls the solenoids in the valves 50, 52, 54 and 56 to first extend an individual jack to correct a low corner and then extend two side jacks if required to next level the vehicle side to side. If during the side to side leveling, a low front or rear is also indicated, then only one jack is used until the front or rear signal is eliminated and then continue with the side to side leveling. The microprocessor will next extend two front or two rear jacks as signaled by the level sensing unit 100. During the extension of the two front or two rear jacks, if a low side signal is again indicated by the sensor 100, the microprocessor 202 will control the solenoids to stop the extension of either the two front or rear jacks and extend the appropriate two side jacks to again level the vehicle side to side.

This sequence will continue until the vehicle is level as indicated by the level sensing unit 100 or until the hydraulic pressure increases to a level to trip the electrical pressure switch 86. As an example, the most common condition that will trip the pressure switch 86 is that of one or more jacks becoming fully extended and thereby providing a pressure build up to trip the switch. Also overloading of a jack or failure of a solenoid valve to open will also cause the pressure switch to trip.

Whenever the pressure switch 86 is tripped, the microprocessor automatically proceeds to the stabilizing step. This is shown by the letter (F) in FIG. 3 wherein the solenoid in valve 82 is actuated. In the stabilizing mode, all jacks not already in contact with the ground with a preset minimum load will be extended. This is accomplished when the solenoid valve 82 is actuated. This exposes the hydraulic fluid in the system to a relief valve which is the relief valve 84, which provides for a low hydraulic pressure in the system, such as a pressure of approximately two hundred pounds per square inch (200 psi). The four solenoids in the valves 50, 52, 54 and 56 are also energized to permit this low hydraulic pressure flow to all of the jacks. The series of check valve 74, 76, 78 and 80 permit the hydraulic fluid to go into the jacks with this low pressure and prevents the fluid from coming out of the jacks already under higher pressure. After a preset time, as shown by the delay 214, the microprocessor 202 de-energizes the main pump solenoid and all of the solenoid valves. The leveling is now complete. The stabilizing mode is not only energized whenever the pressure switch 86 is tripped, but also after the level sensing unit 100 provides a signal that the vehicle is leveled. The stabilizing mode is indicated by the letter (F) in FIG. 3 and provides for an enhanced stability of the vehicle 10 without affecting the leveling previously provided in the vehicle.

When it is desired to retract the jacks for transit, the following procedure is followed. If the vehicle has air suspension, then the vehicle is started to rebuilt the air pressure. Once the air pressure is rebuilt, then the master switch 204 is operated followed by the automatic retraction switch 216. The microprocessor 202 will now for a preset amount of time, energize the four jack solenoid valves 50, 52, 54 and 56 and the horizontal/vertical solenoid valve 36. When all of these valves are energized this vents the jacks 12, 14, 16 and 18 to the reservoir 26 thereby allowing the jacks to retract and also to pivot to the horizontal position to become stored at the bottom of the vehicle.

It will be appreciated that the system shown in FIG. 2 could also be operated manually as well as automatically. This can be accomplished by providing for manually operating switches for each individual and each pair of jacks and by manually operating these switches until an indication will be provided that the vehicle has been leveled. Initially, the master switch 204 would be turned on to provide for hydraulic fluid in the system. In addition, the solenoid in valve 36 would be opened so as to direct fluid to all the jack actuators and actuate the jacks to a vertical position. Then individual and then pairs of jacks may be manually extended or retracted such as both right, both front, both left and both rear jacks to provide for leveling. For example, if a pair of jacks is to be extended, the pump is actuated and the two respective solenoid vavles are opened. If a jack is to retracted, only the two respective solenoid valves are opened allowing the fluid to return to the reservoir 26.

Figure 6:
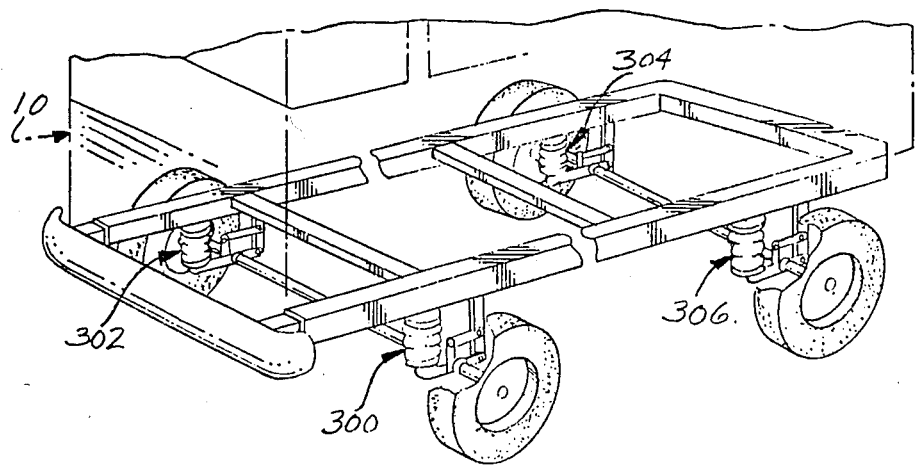
FIG. 6 is a schematic perspective view illustrating a disposition of airbags in a recreational vehicle.

FIG. 6 illustrates a vehicle 10 incorporating airbags 300, 302, 304 and 306. This type of vehicle may also include jacks as shown in FIG. 1 and the leveling of such a vehicle would be described above. However, it is also possible to use the airbags incorporated in the vehicle itself to provide for an automatic leveling system using the level sensing unit 100 as shown in FIGS. 4 and 5. As shown in FIG. 6, the automatic leveling may be provided using the existing airbags and also using other existing structures which form part of the airbag suspension system normally present in the vehicle 10. Each airbag is an integral part of the vehicle suspension and is located by each wheel, such as airbag 300 by the left front wheel, airbag 302 by the right front wheel, airbag 304 by the right rear wheel and airbag 306 by the left rear wheel. The recreational vehicle also includes existing mechanically operated air suspension valves 308 and 310 at the rear and 312 at the front. In addition, the system requires a continuous air supply and typically the recreational vehicle would include an existing engine driven compressor 314 supplying an air tank 316. This system is supplemented with a small electrical auxiliary compressor 318 which will remain functioning for an extended period such as approximately twelve hours when the engine driven compressor 314 is not operating. Some air bag system do not allow for individual control of the pair of front air bags. In this type of system the vehicle can be leveled from front to rear with pair of air bags but from side to side using only the rear air bags, one at a time.

Figure 7:
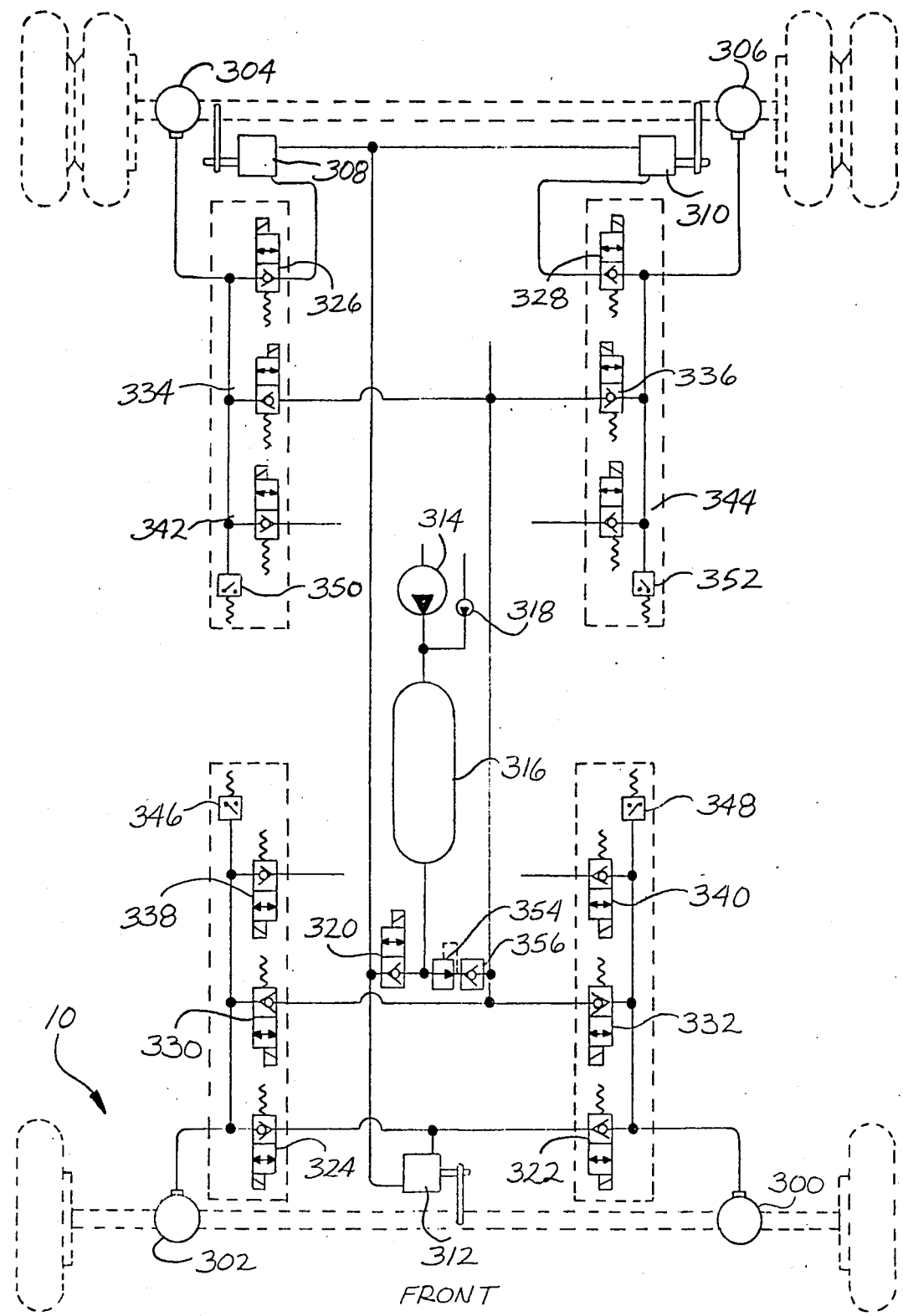
FIG. 7 is a schematic block diagram of a circuit for controlling the operation of the air bags of FIG. 6.

In order to provide for the proper air suspension during normal travel, the system shown in FIG. 7 includes a plurality of electrically operated air valves 320, 322, 324, 326 and 328. These electrically operated air valves may be of any standard design but must be capable of continuous duty. Typically these air valves, which are driven by a solenoid, allow air passage in both direction when opened (energized) and allow air passage in one direction when closed (deenergized). The various valves therefore include check valves as shown to be part of each valve in order to stop air flow in one direction when closed. If the system does not provide for individual control of the front air bags, then either valve 322 or 324 is eliminated and the remaining valve coupled to existing valve 312.

During the normal travel mode, the five travel solenoids 320, 322, 324, 326 and 328 are opened, thus making the normal air suspension functional. Each airbag has associated with it a pair of air solenoid valves, one to allow the passage of air to extend the airbag up and one to exhaust any air in the airbag. Specifically, solenoids 330, 332, 334 and 336 provide for the passage of air to have the airbags move up and solenoids 338, 340, 342 and 344 allow for the exhausting of air from the airbags. Pressure switches 346, 348, 350 and 352 sense excess pressure in the airlines to individual airbags. Air to the up solenoids 330, 332, 334 and 336 is controlled through a regulator 354 and a check valve 356. If the system does not provide for individual control of the front air bags, then either group of valves and switches 330, 338 and 346 or 332, 340 and 348 is eliminated.

The system uses the same level sensing unit as shown in FIGS. 4 and 5. As shown in these figures, the level sensing unit consists of four switches mounted on a plate and electrically connected as shown in FIG. 5. The sensing unit is oriented so that the individual switches are mounted laterally and longitudinally with respect to the vehicle so that the signals produced by the sensing unit is right side low, left side low, front low, rear low or any corner low.

The system of FIG. 7 uses the same leveling concept as the hydraulic system of FIG. 2 in that the system generally inflates or deflates two airbags at a time by operating the two front, two rear, two right or two left airbags. The vehicle is gently tilted right or left, forward or backward. Therefore, the vehicle is equally supported at all four corners so as to minimize twisting, stress and deflection. Individual air bags may also be used at periodic times are described above.

In order to insure that the system operates properly, the system is programmed to remain active throughout the period during which the level status is desired, such as throughout the night. Since air leaks are commonplace in vehicle air suspension systems, the microprocessor system such as shown in FIG. 3, periodically checks and adjusts the system so that the level of the vehicle may be maintained by air loses.

In general, a microprocessor system, such as that shown in FIG. 3, may be used with the airbag system shown in FIG. 7. This system operates in the following fashion. A master switch may be turned on to initially deenergize the five travel solenoids 320, 322, 324, 326 and 328 to disable the suspension system. The next step is to energize the four down solenoids 338, 340, 342 and 344 for a sufficient period of time so as to exhaust all of the airbags. The microprocessor then receives the signals from the level sening unit and the microprocessor energizes either the two right up solenoids 330 and 334 or the two left up solenoids 332 and 336 to thereby direct air to two airbags at a time to initially level the vehicle side to side. If a corner signal is received, as discussed above, then individual air bags may be activated as described above to correct this problem before continuing with the side to side leveling. When the sensing unit indicates that the vehicle is level side to side, or when the pressure limit is reached as indicated by one of the pressure switches 346, 348, 350 and 352, then the two solenoids will be deenergized. As a precautionary measure, anytime a pressure switch is tripped the microprocessor can stop the leveling process and provide an indication that the pressure switch has been tripped.

The next process is to then energize either the front up solenoids 330 and 332 or the back up solenoids 334 and 336, again depending upon the signal from the sensing unit. If the sensing unit again indicates that the sides are low, the microprocessor will stop and correct the side-to-side level and any low corner and then continue with the front up or rear up. This process continues until the sensing unit indicates that the vehicle is level or until there is a pressure limit shutdown by one of the pressure switches.

Once the vehicle is level the microprocessor will maintain the system in a rest mode. Typically, one or more of the airbags will be left uninflated when the vehicle is level since normally one of the airbags will not have to be inflated in order for the level to be accomplished. Having one airbag uninflated helps reduce the effect of wind and movement of the vehicle after the leveling is accomplished.

The microprocessor may also provide for a periodic recheck of the level sensor. If the level sensor indicates that the vehicle is now out of level, the microprocessor can attempt to relevel by energizing the down solenoids opposite the low side or end of the vehicle so as to exhaust the air in order to provide for the leveling. However, if the vehicle cannot be leveled by lowering within a given amount of time, the processor can relevel the vehicle by energizing pairs of up solenoids as described above. In this way the vehicle is always leveled in as low a stance as possible.

If the system is of the type wherein the two front air bags connot be controlled individually, then the system is controlled by the microprocessor as follows. First the two rear air bags are exausted. If the rear sensor is on by itself, then the two front air bags are lowered to level the vehicle, this would occur only once during the start up. If more than one sensor is on indicating a low corner, then the vehicle is leveled first side to side by raising individual ones of the rear air bags and then from to back using pairs of front or rear air bags. The side sensors dominate so that the leveling will stop a front to back leveling and switch to a side leveling before returning to the front to back leveling.

The present invention, therefore, provides for a unique leveling system which can be characterized as a bi-axis leveling system in that the system generally operates either two jacks or two airbags at a time. Specifically, the system operates either two front, two rear, two right or two left jacks or bags so that the vehicle is tilted from side-to-side and from front-to-back so as to provide for a leveling of the vehicle. In this way, the vehicle is normally supported at four places so as to minimize twisting, stress and deflection in the vehicle.

Although the invention has been described with reference to particular embodiments, it is to be appreciated that various adaptations and modifications may be made and the invention is only to be limited by the appended claims.

We claim:

1. In combination for use in a vehicle having a front, a back and sides to level the vehicle relative to gravity,
    a plurality of jacks each disposed at an individual position relative to the vehicle and in displaced relationship to the other jacks for adjusting the vertical position of the vehicle relative to gravity in accordance with the operation of pairs of adjacent jacks,
    means disposed relative to the vehicle for sensing the tilting of the vehicle from a level disposition relative to gravity,
    means responsive to the sensing means for operating at particular times pairs of adjacent jacks in a particular order to obtain an adjustment in the vertical position of the vehicle from side and front to back to obtain a resultant leveling of the vehicle to gravity, and
    the means for sensing the tilting of the vehicle senses a low corner and with the means for operating pairs of jacks additionally operating an individual jack to correct the low corner before the pairs of the jacks are operated to level the vehicle.

2. The combination of claim 1 wherein the jacks are disposed at four corner positions relative to the vehicle so that two left or two right side jacks provide for the side to side vertical adjustment and and two front or two back jacks provide for the front to back vertical adjustment.

3. The combination of claim 1 wherein the jacks are hydraulic and are initially mounted horizontally and including means for pivoting the jacks from the horizontal to a vertical position to provide for a downward extension of the pairs of the jacks to level the vehicle.

4. The combination of claim 1 wherein the sensing means is formed by a plurality of switches disposed on a support member and with each switch associated with one of the front, back or side portions of the vehicle.

5. The combination of claim 4 wherein each switch is an elongated member for sensing tilting of the vehicle in the direction of elongation of the switch and with the direction of elongation of each switch extending toward one of the front, back or side portions of the vehicle.

6. The combination of claim 1 wherein the particular order of operating jacks is first leveling of the vehicle side to side before leveling of the vehicle front to back.

7. The combination of claim 6 wherein if during operation of pairs of adjacent jacks to provide leveling of the vehicle front to back, the sensing means senses tilting of the vehicle side to side, the front to back leveling is discontinued and the side to side leveling is again initiated.

8. The combination of claim 1 additionally including means for operating any of the individual jacks not touching the ground after leveling for stabilizing the vehicle after leveling.

9. The combination of claim 8 wherein the stabilizing means includes providing a particular minimum operating force to all of the jacks below the normal force of any jacks in contact with the ground so that any jack not in contact with the ground will be extended to touch the ground with the particular minimum force and any jack in contact with the ground will not the effected.

10. In combination for use in a vehicle having a front, back and sides to level the vehicle relative to gravity,
    a plurality of vertical displacement means each disposed at an individual position relative to the vehicle and in displaced relationship to the other vertical displacement means for adjusting the vertical position of the vehicle relative to gravity in accordance with the operation of pairs of adjacent vertical displacement means,
    a plurality of switches supported relative to the vehicle and having open and closed states and constructed to become opened and closed in accordance with the tilting of the vehicle and with each of the switches being disposed to indicate the tilting of the vehicle relative to gravity from side to side and front to back,
    means responsive to the opening and closing of the different switches in the plurality in accordance with the tilting of the vehicle relative to gravity for operating at particular times pairs of adjacent vertical displacement means in a particular order to obtain an adjustment in the vertical position of the vehicle from side to side and front to back to obtain a resultant levelling of the vehicle relative to gravity, and
    the operation of two of the switches at the same time indicating the tilting of the vehicle toward one corner of the vehicle and with the means for operating pairs of vertical displacement means additionally operating an individual vertical displacement means to correct the tilting of the vehicle toward the one corner before the pairs of the vertical displacement means are operated to level the vehicle.

11. The combination of claim 10 wherein the vertical displacement means are air bags.

12. The combination of claim 11 wherein two air bags are positioned at the front of the vehicle and two air bags at the back of the vehicle and with the two front air bags controlled together and with the front to rear leveling provided by the pairs of front or rear air bags and with the side to side leveling provided by the individual control of the rear air bags.

13. The combination of claim 11 wherein the air bags are exhausted before the pairs of air bags are operated to level the vehicle.

14. The combination of claim 10 wherein the vertical displacement means are disposed at four corner positions relative to the vehicle so that two left or two right side vertical displacement means provide for the side to side vertical adjustment and two front or two back vertical displacement means provide for the front to back vertical adjustment.

15. The combination of claim 10 wherein the vertical displacement means are hydraulic jacks.

16. The combination of claim 15 wherein the hydraulic jacks are initially mounted horizontally and including means for pivoting the jacks from the horizontal to a vertical position to provide for a downward extention of the pairs of the jacks to level the vehicle.

17. The combination of claim 10 wherein the plurality of switches are disposed on a support member which is in turn supported by the vehicle for tilting relative to gravity in accordance with the tilting of the vehicle relative to gravity.

18. The combination of claim 17 wherein each switch is an elongated member for sensing tilting of the vehicle in the direction of elongation of the switch and with the direction of elongation of each switch extending toward one of the front, back or side portions of the vehicle.

19. The combinatin of claim 10 wherein the particular order of operating vertical displacement means is first leveling of the vehicle side to side before leveling of the vehicle front to back.

20. The combination of claim 19 wherein if during operation of pairs of adjacent vertical displacement means to provide leveling of the vehicle front to back, the sensing means senses tilting of the vehicle side to side, the front to back leveling is discontinued and the side to side leveling again initiated.

21. The combination of claim 10 additionally including means for operating any of the individual vertical displacement means not touching the ground after leveling for stabilizing the vehicle after leveling.

22. The combination of claim 21 wherein the stabilizing means includes providing a particular minimum operating force to all of the vertical displacement means below the normal force of a vertical displacement means in contact with the ground so that any vertical displacement means not in contact with the ground will be extended to touch the ground with the particular minimum force and any vertical displacement means in contact with the ground will not be effected.

23. In combination for use in a vehicle having a front, back and sides and with suspension means including air bags located at individual displaced positions to level the vehicle relative to gravity, means disposed relative to the vehicle for sensing the tilting of the vehicle from a level disposition relative to gravity, means responsive to the sensing means for operating at particular times pairs of adjacent air bags in a particular order to obtain an adjustment in the vertical position of the vehicle from side to side and front to back to obtain a resultant leveling of the vehicle relative to gravity, and if during operation of pairs of adjacent air bags to provide leveling of the vehicle front to back, the sensing means senses tilting of the vehicle side to side, the front to back leveling is discontinued and the side to side leveling is again initiated.

24. The combination of claim 23 wherein the air bags forming part of the suspension means are disposed at four corner positions relative to the vehicle so that two left or two right side air bags provide for the side to side vertical adjustment and two front or two back air bags provide for the front to back vertical adjustment.

25. The combination of claim 23 wherein the airbags forming part of the suspension means are disposed at four corner positions relative to the vehicle and with the two front air bags operated together so that two front or two back air bags provide for the front to back vertical adjustment and individual ones of the two back air bags provide for the front to back vertical adjustment.

26. The combination of claim 23 wherein the air are initially exhausted before the pairs of the air bags are operated to level the vehicle.

27. The combination of claim 23 wherein the sensing means is formed by a plurality of switches disposed on a support member and with each switch associated with one of the front, back or side portions of the vehicle.

28. The combination of claim 27 wherein each switch is an elongated member for sensing tilting of the vehicle in the direction of elongation of the switch and with the direction of elongation of each switch extending toward one of the front, back or side portions of the vehicle.

29. The combination of claim 23 wherein the particular order of operating air bags is first leveling of the vehicle side to side before leveling of the vehicle front to back.

30. In combination for use in a vehicle having a front, a back and sides to level the vehicle relative to gravity, a plurality of jacks each disposed at an individual position relative to the vehicle and in displaced relationship to the other jacks for adjusting the vertical position of the vehicle relative to gravity in accordance with the operation of pairs of adjacent jacks, means disposed relative to the vehicle for sensing the tilting of the vehicle from a level disposition relative to gravity, means responsive to the sensing means for operating at particular times pairs of adjacent jacks in a particular order to obtain an adjustment in the vertical position of the vehicle from side to side and front to back to obtain a resultant leveling of the vehicle to gravity, the particular order of operating the jacks is first leveling of the vehicle side to side before leveling of the vehicle side to side before leveling of the vehicle front to back, and wherein if during operation of pairs of adjacent jacks to provide leveling of the vehicle front to back, the sensing means senses tilting of the vehicle side to side, the front to back leveling is discontinued and the side to side leveling is again initiated.

31. The combination of claim 30 wherein the jacks are disposed at four corner positions relative to the vehicle so that two left or two right side jacks provide for the side to side vertical adjustment and two front or two back jacks provide for the front to back vertical adjustment.

32. The combination of claim 30 wherein the jacks are hydraulic and are initially mounted horizontally and including means for pivoting the jacks from the horizontal to a vertical position to provide for a downward extention of the pairs of the jacks to level the vehicle.

33. The combination of claim 30 wherein the sensing means is formed by a plurality of switches disposed on a support member and with each switch associated with one of the front, back or side portions of the vehicle.

34. The combination of claim 33 wherein each switch is an elongated member for sensing tilting of the vehicle in the direction of elongation of the switch and with the direction of elongation of each switch extending toward one of the front, back or side protions of the vehicle.

35. The combination of claim 30 additionally including means for operating any of the individual jacks not touching the ground after leveling for stabilizing the vehicle after leveling.

36. The combination of claim 35 wherein the stabilizing means includes providing a particular minimum operating force to all of the jacks below the normal force of any jacks in contact with the ground so that any jack not in contact with the ground will be extended to touch the ground with the particular minimum force and any jack in contact with the ground will not be effected.

37. In combination for use in a vehicle having a front, back and sides to level the vehicle relative to gravity,
a plurality of vertical displacement means each disposed at an individual position relative to the vehicle and in displaced relationship to the other vertical displacement means for adjusting the vertical position of the vehicle relative to gravity in accordance with the operation of pairs of adjacent vertical displacement means,
a plurality of switches supported relative to the vehicle and having open and closed states and constructed to become opened and closed in accordance with the tilting of the vehicle and with each of the switches being disposed to indicate the tilting of the vehicle relative to gravity from side to side and front to back, and
the particular order of operating the vertical displacement means is first leveling of the vehicle side to side before leveling of the vehicle front to back, and if during operation of pairs of adjacent vertical displacement means to provide leveling of the vehicle front to back, the sensing means senses tilting of the vehicle side to side, the front to back leveling is discontinued and the side to side leveling again initiated.

38. The combination of claim 37 wherein the vertical displacement means are air bags.

39. The combinatin of claim 38 wherein two air bags are positioned at the front of the vehicle and two air bags at the back of the vehicle and with the two front air bags controlled together and with the front to rear leveling provided by the pairs of front or rear air bags and with the side to side leveling provided by the individual control of the rear air bags.

40. The combination of claim 38 wherein the air bags are exhausted before the pairs of air bags are operated to level the vehicle.

41. The combination of claim 37 wherein the vertical displacement means are disposed at four corner positions relative to the vehicle so that two left or two right side vertical displacement means provide for the side to side vertical adjustment and two front or two back vertical displacement means provide for the front to back vertical adjustment.

42. The combination of claim 37 wherein the vertical displacement means are hydraulic jacks.

43. The combination of claim 42 wherein the hydraulic jacks are initially mounted horizontally and including means for pivoting the jacks from the horizontal to a vertical position to provide for a downward extention of the pairs of the jacks to level the vehicle.

44. The combination of claim 37 wherein the plurality of switches are disposed on a support member which is in turn supported by the vehicle for tilting relative to gravity in accordance with the tilting of the vehicle relative to gravity.

45. The combination of claim 44 wherein each switch is an elongated member for sensing tilting of the vehicle in the direction of elongation of the switch and with the direction of elongation of each switch extending toward one of the front, back or side portions of the vehicle.

46. The combination of claim 37 additionally including means for operating any of the individual vertical displacement means not touching the ground after leveling for stabilizing the vehicle after leveling.

47. The combination of claim 46 wherein the stabilizing means includes providing a particular minimum operating force to all of the vertical displacement means below the normal force of a vertical displacement means in contact with the ground so that any vertical displacement means not in contact with the ground will be extended to touch the ground with the particular minimum force and any vertical displacement means in contact with the ground will not be effected.

* * * * *